(12) United States Patent
Engelhardt et al.

(10) Patent No.: US 8,698,461 B2
(45) Date of Patent: Apr. 15, 2014

(54) DIRECT POWER CONTROL WITH COMPONENT SEPARATION

(75) Inventors: Stephan Engelhardt, Sonsbeck (DE); Joerg Kretschmann, Kempen (DE)

(73) Assignee: Woodward Kempen GmbH, Kempen (DE)

( * ) Notice: Subject to any disclaimer, the term of this patent is extended or adjusted under 35 U.S.C. 154(b) by 532 days.

(21) Appl. No.: 13/063,148

(22) PCT Filed: Sep. 11, 2008

(86) PCT No.: PCT/EP2008/062088
§ 371 (c)(1), (2), (4) Date: May 24, 2011

(87) PCT Pub. No.: WO2010/028689
PCT Pub. Date: Mar. 18, 2010

(65) Prior Publication Data
US 2011/0215775 A1     Sep. 8, 2011

(51) Int. Cl.
*H02P 9/46* (2006.01)
(52) U.S. Cl.
USPC .............................................. 322/47; 322/37
(58) Field of Classification Search
USPC ........................................ 322/20, 37, 44, 47
See application file for complete search history.

(56) References Cited

U.S. PATENT DOCUMENTS

| 7,095,131 | B2* | 8/2006 | Mikhail et al. | 290/44 |
|---|---|---|---|---|
| 7,423,406 | B2 | 9/2008 | Geniusz | |
| 7,518,257 | B2* | 4/2009 | Guey et al. | 290/44 |
| 8,183,704 | B2* | 5/2012 | Rivas et al. | 290/44 |

(Continued)

FOREIGN PATENT DOCUMENTS

| DE | 102006027465 A1 | 12/2007 |
|---|---|---|
| EP | 1630948 A1 | 3/2006 |

(Continued)

OTHER PUBLICATIONS

Office action dated Dec. 4, 2012 in corresponding Chinese Patent Application No. 200880131039.X.

(Continued)

*Primary Examiner* — Nicholas Ponomarenko
(74) *Attorney, Agent, or Firm* — Rankin, Hill & Clark LLP

(57) ABSTRACT

The invention relates to a method to control power output of a doubly-fed induction machine to a grid including the steps of measuring grid voltage and grid current in a three phase coordinate system, transforming grid voltage and grid current into a stator frame coordinate system, decomposing the grid voltage and grid current in the stator frame coordinate system in a positive sequence system and in a negative sequence system, calculating active and reactive power in the positive and negative sequence system, and controlling active and reactive power in the positive and negative sequence system. The object to provide a method to control power output of a doubly-fed induction machine which provides good dynamics and is able to allow fault-ride-through operations when unbalanced grid voltages occurs is solved in that active and reactive power in the positive and negative sequence system are used as independent state variables in a state controller, whereas the state controller generates manipulated values in the positive and negative sequence system separately which are subjected as manipulated state vectors to a state feedback in a stator frame coordinate system without further control loops before the manipulated vector resulting from state feedback is used to set the rotor voltage.

16 Claims, 1 Drawing Sheet

(56) References Cited

U.S. PATENT DOCUMENTS

| | | | |
|---|---|---|---|
| 8,242,753 B2* | 8/2012 | Engelhardt et al. | 322/20 |
| 8,294,288 B2* | 10/2012 | Rivas et al. | 290/44 |
| 8,415,818 B2* | 4/2013 | Engelhardt et al. | 290/44 |
| 8,476,871 B2* | 7/2013 | Ooi et al. | 322/24 |
| 8,593,114 B2* | 11/2013 | Park et al. | 322/24 |
| 2009/0267572 A1 | 10/2009 | Engelhardt et al. | |

FOREIGN PATENT DOCUMENTS

| | | |
|---|---|---|
| EP | 1630948 A1 | 3/2006 |
| WO | 2007/144267 A1 | 12/2007 |
| WO | 2008/061698 | 5/2008 |

OTHER PUBLICATIONS

Zhou, Y. et al.; "Control of DFIG under Unsymmetrical Voltage Dip"; IEEE 38th Annual Power Electronics Specialists Conference, Jun. 17-21, 2007; Orlando, Florida; IEEE, Piscataway, New Jersey, Jun. 17, 2007; pp. 933-938; XP002497304.

Jeong-Ik Jang et al.; "Active and Reactive Power Control of DFIG for Wind Energy Conversion under Unbalanced Grid Voltage"; Power Electronics and Motion Control Conference; IPEMC'06; CES/IEEE 5th International, IEEE, PI, Aug. 1, 2006; pp. 1-5; XP031014344.

Santos-Martin, D. et al.; "Direct Power Control Applied to Doubly Fed Induction Generator Under Unbalanced Grid Voltage Conditions"; IEEE Transactions of Power Electronics, IEEE Service Center, Piscataway, New Jersey; vol. 23, No. 5; Sep. 1, 2008; pp. 2328-2336; XP011235360.

International Preliminary Report on Patentability dated Mar. 24, 2011 in International Patent Application No. PCT/EP2008/062088, filed Sep. 11, 2008.

The International Search Report and the Written Opinion of the International Searching Authority; International Application No. PCT/EP2008/062088; Jun. 4, 2009.

\* cited by examiner

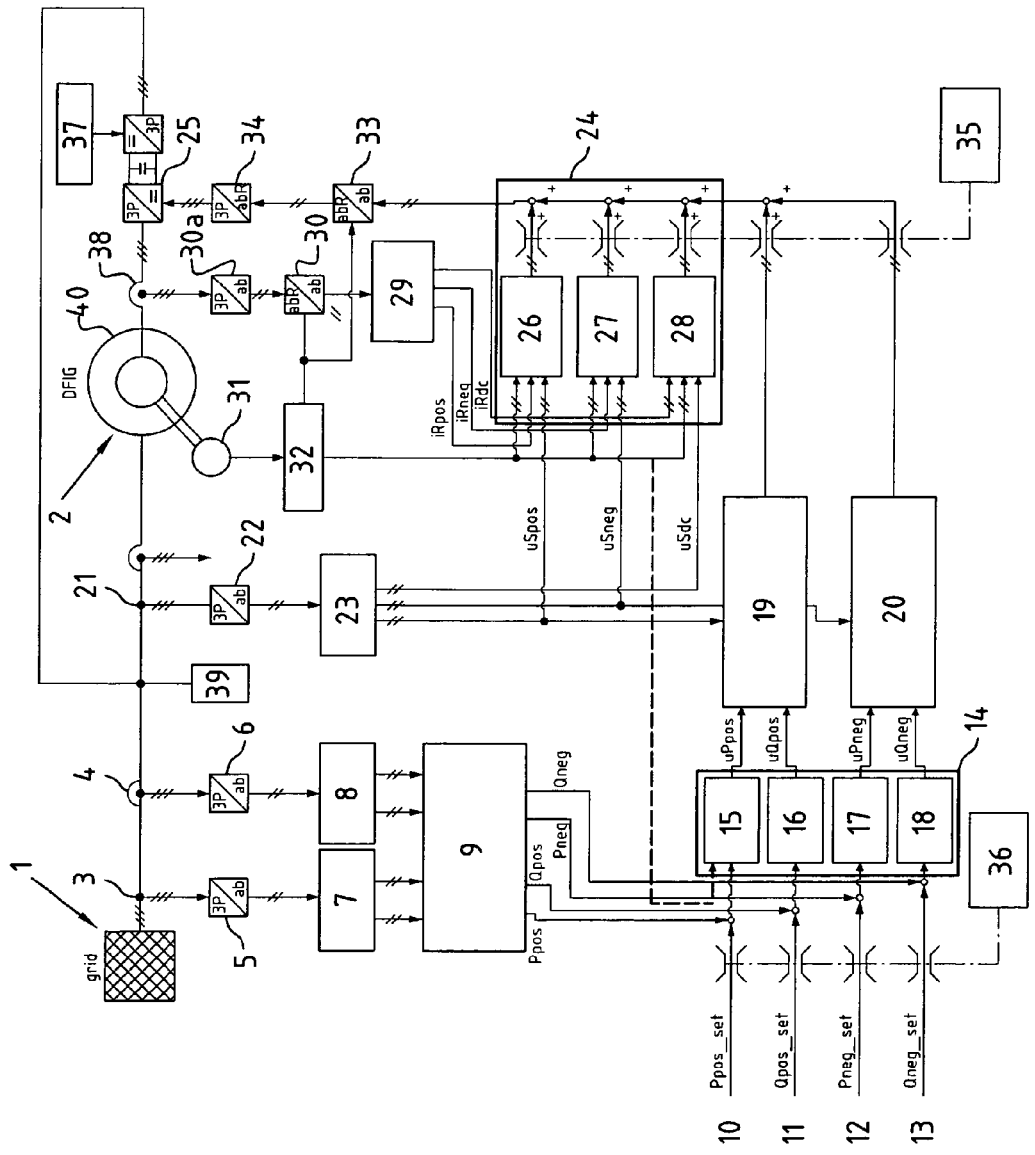

DIRECT POWER CONTROL WITH COMPONENT SEPARATION

The invention relates to a method to control power output of a doubly-fed induction machine to a grid including the steps:
measuring grid voltage and grid current in a three phase coordinate system,
transforming grid voltage and grid current into a stator frame coordinate system,
decomposing the grid voltage and grid current in the stator frame coordinate system in a positive sequence system and in a negative sequence system,
calculating active and reactive power in the positive and negative sequence system, and
controlling active and reactive power in the positive and negative sequence system.

Furthermore, the invention relates to a device to control power output of a doubly-fed induction machine (DFIG) to a grid, a computer program enabling processor means to control power output of a doubly-fed induction machine and the advantageous use of the inventive method.

The use of doubly-fed induction machines or doubly-fed generators (DFIG) in wind turbines together with a converter is becoming more popular because the DFIG-based wind turbine offers a variable speed operation, four-quadrant active and reactive power capabilities combined with lower converter expenses and a reduced power loss compared to wind turbines using fixed speed induction generators or fully-fed synchronous generators with full-sized converters. The control of a doubly-fed induction machine is based usually on either a flux-oriented or stator-voltage-oriented vector control. The aim of both controlling methods is to decouple the rotor current into active and reactive current components and to control active and reactive power supplied by the doubly-fed induction machine with a rotor current controller. The continuity of the power output of the doubly-fed induction machine is in particular relevant for wind energy systems like wind turbines and wind turbine plants. In order to maximize the use of wind power to generate electrical power it is an aim to optimize the control of the DFIG even for unbalanced grid voltages. Therefore, it is desirable to keep the generator connected to the grid as long as possible and to eliminate or reduce the effect of the unbalanced grid voltages. The common control methods, however, are not optimized to handle unbalanced grid voltages, because unbalanced grid voltages cause unbalanced stator currents which produce torque pulsations of the rotor. This results in a higher wear of the mechanical elements for example of a wind turbine. In order to provide a control of the active and reactive power of a DFIG under unbalanced grid voltages it was proposed by Young et al. in "Active and reactive power control of DFIG for wind energy conversation under unbalanced grid voltage", Power Electronics and Motion Control Conference, IPEMC 2006 to decompose the power control into a power control of the positive sequence components and negative sequence components, whereby a power controller and a subordinated current controller are used to generate manipulated vectors in the positive sequence system and the negative sequence system which are added together in order to control the rotor current of the DFIG. Although, the known method to control power output of a DFIG considers unbalanced grid voltages the dynamics of the known method can be improved.

Therefore, it is an object of the present invention to provide a method for controlling power output of a doubly-fed induction machine which provides good dynamics and is able to allow fault-ride-through operations when unbalanced grid voltages occur. Furthermore, it is an object of the present invention to provide a device to control power output of a doubly-fed induction machine and a computer program product. Finally, the invention shall propose at least one advantageous use of the inventive method.

According to a first aspect of the invention, the above mentioned object is solved in that active and reactive power in the positive and negative sequence system are used as independent state variables in a state controller, whereas the state controller generates manipulated values in the positive and negative sequence system separately which are subjected as manipulated state vectors to a state feedback in a stator frame coordinate system without further control loops before the manipulated vector resulting from state feedback is used to set the rotor voltage. Preferably, setting the rotor voltage takes place in the rotor frame coordinate system.

In opposition to the prior art control method described above the inventive method does not use further subordinated control loops to generate the manipulated vector and is therefore a direct power control method with only one state controller. This enhances the dynamics of the control method considerably. The abandonment of further subordinated control loops is possible due to the use of a state feedback to which the manipulated vector generated by the state controller is subjected to. Unbalanced grid voltage states effect only the manipulated values generated by the controller for the negative sequence system. Hence, a quick control of the states into a balanced grid voltage state is possible. Furthermore, independently of the control of unbalanced grid voltage states it is possible to control in parallel the power output with high dynamics via the manipulated values generated by the controller for the positive sequence system. A "Fault-Ride-Through" operation is possible. As a result the inventive control method provides a control with a considerably higher dynamic which allows additionally a "Fault-Ride-Through" operation.

According to a first embodiment of the present invention the state controller generates manipulated values separately for the positive and negative sequence system with which a state vector in the stator frame coordinate system is generated separately for the positive and negative sequence system in order to simplify state feedback in the stator frame coordinate system.

To reduce the effort for the state feedback according to a next preferred embodiment of the inventive method the manipulated state vectors of the positive sequence system are added to the state vector of the negative sequence system before the resulting single state vector is subjected to the state feedback.

The inventive control method can be improved further according to a next embodiment of the present invention in that a state feedback vector for the positive and/or negative sequence system and/or the dc component system is added to the state vector during state feedback. Separating the state feedback vectors into feedback vectors of the positive and negative sequence systems and a dc component system allows on the one hand a state feedback separately for the different components which simplifies the control algorithms. On the other hand in particular the state feedback vector of the dc component system allows to feed back state deviations occurring temporary at grid faults. Moreover separate feed back for the different components improves the dynamic of the inventive control method additionally.

The costs for implementing the inventive control method can be reduced even compared to conventional methods to control power output of doubly-fed induction machines in that preferably the stator voltage and the rotor current together with values of the rotor position and the rotor speed are used to calculate the state feedback vectors in the positive and negative sequence system as well as in the dc component system. For variable speed control of the DFIG relatively expensive dc-current measurement means on the rotor side are needed anyway to guarantee stability around synchronism. On the stator side usually inexpensive ac-current measurement means are installed. But for accurate control during grid transients the influence of the dc-components of the stator current has to be taken into account. Hence, the expensive use of means to measure the stator current dc-components can be avoided. Due to the use of the stator voltage and rotor current to calculate the state feedback vectors the accuracy of the inventive control method is given.

According to a next advantageous embodiment of the present invention, the state controller receives as input values the difference of preset values and measured values for the active and reactive power in the positive and negative sequence system to generate a manipulated value, whereas optionally each manipulated value is generated by a single controller. At first this enables an easy way to preset active and reactive power output of the DFIG by simply setting the preset values of the active and reactive power in particular in the positive sequence system. The "Fault-Ride-Through" operation can be easily allowed by setting values for the active and reactive power in the negative sequence system. Furthermore, the dynamic can be further improved if each manipulated value is generated by a single controller.

Preferably according to a next advantageous embodiment of the invention, the state controller comprises at least one PI-controller. Proportional plus integral controllers are very simple controllers with a high dynamic. However, it is possible to use more complex controllers, inter alia a PID-controller, to generate manipulated values for the state vectors, too.

According to a next embodiment of the invention the preset values of the active and reactive power in the positive and negative sequence system are limited to preset values. This allows a simple limitation of preset values, in order to protect the DFIG for damages due to improper preset values of the active and reactive power.

Since the manipulated values of the controller are state variables it is preferred according to a next embodiment of the present invention that the manipulated state vectors in the positive and negative sequence system of the stator frame system are calculated separately using the stator voltage vector and the manipulated values generated by the state controller. As a result the state vectors are transformed into the stator frame coordinate system which can be easily subjected to the state feedback in the same coordinate system.

According to a further preferred embodiment of the present invention the limitation of the components of each state feedback vector as well as the limitation of the components of the state vectors of the positive and negative sequence system is prioritized in order to avoid impossible state vectors which are used to set the rotor voltage. This is a further possibility to protect the DFIG against damages. The prioritization according to further embodiment takes places in that at the latest the state feedback vector of the positive sequence system is limited, in order to allow under all circumstances a good control of the regulation of the active and reactive power output in line with the stator frame system.

Finally according to a further embodiment of the present invention, the state controller generates voltage values of the active and reactive power in the positive and negative sequence system as manipulated values. This allows the simple use of the measured stator voltage values in the positive and in the negative sequence system to transform the manipulated values generated by the controller into the positive and negative sequence system of the stator frame coordinate system. Of course it is possible that the state controller generates current values related to active and reactive power values. However, this may lead to a more complex realization of the inventive method.

According to a second aspect of the present invention the above mentioned object is solved by a device for controlling the power output of a doubly-fed induction machine to grid enabling the inventive method and comprising means to measure grid voltage and grid current, means to transform grid voltage and grid current into a stator frame coordinate system, means to decompose at least positive and negative sequence system components of the grid voltage and grid current, means to calculate active and reactive power in the positive and negative sequence system, a state controller, which generates manipulated state values in the positive and the negative sequence system separately and to provide a state feedback to generate a manipulated vector used to set rotor voltage.

According to a next aspect of the present invention the above mentioned object is solved by a computer program enabling processor means to control power output of a doubly-fed induction machine according to the inventive method. Although in most cases a computer program realizes the inventive method it is even possible to realize the inventive method partly or completely implemented in hardware.

At least according to a fourth aspect of the present invention, the above mentioned object is solved by the use of the method to control power output to a grid of a wind turbine or a wind park comprising wind turbines with doubly-fed induction machines.

With respect to the advantages of the inventive device, computer program and inventive use of the inventive method, it is referred to the statements regarding the first aspect of the present invention.

There are a lot of possibilities to develop the inventive method to control power output of a doubly-fed induction machine, the inventive device to control the power output of a DFIG, the inventive computer program or the inventive use. Hereunto it is referred to the subordinated claims of claim 1 as well as to the description of a preferred embodiment of the present invention together with the drawings.

In the single FIG. 1 of the drawing a preferred embodiment of the inventive method is shown in a schematic block diagram. At first FIG. 1 shows the utility grid 1 and the doubly-fed induction machine 2 abbreviated with DFIG. In order to provide the inventive method, means to measure the grid voltages 3 and the grid currents 4, both in a three phase system, are shown. Thereafter the measured grid voltages and grid currents are transformed into a stator frame coordinate system ab with means 5, 6. Derived from the stator frame coordinate system, a positive sequence system and a negative sequence system are defined and the measured voltage and current values are transformed into both systems.

Usually the voltage and current vectors in the positive sequence system rotate with 50 Hz respectively 60 Hz in mathematical positive direction, whereas the vectors in the negative sequence system rotate in opposite direction also with 50 Hz, respectively 60 Hz. The decomposition into the components of the positive and negative sequence system of the measured grid voltage 3 and the measured grid current 4 is done in blocks 7, 8.

The separation or decomposing into a positive sequence system and a negative sequence system can be achieved by using appropriate filters not shown in the drawing. The values of the grid voltage and the grid current in the positive and negative sequence systems are delivered to means 9 to calculate power values $P_{pos}$, $Q_{pos}$, $P_{neg}$ and $Q_{neg}$ of the positive and the negative sequence system. In the positive sequence system the values of $P_{pos}$ and $Q_{pos}$ are determined as follows from the measured grid voltage and current values:

$$P_{pos} = Re\{\underline{u}_{n,pos} \cdot \underline{i}^*_{n,pos}\} \tag{1}$$

or alternatively $$P_{pos} = Re\{\underline{u}_{n,pos} \cdot \underline{i}^*_{n,pos}\} + Re\{\underline{u}_{n,neg} \cdot \underline{i}_{n,neg}\} \tag{2}$$

with:
$u_{n,pos}$ as measured grid voltage vector in the positive sequence stator frame coordinate system and
$i^*_{n,pos}$ as conjugate complex grid current vector in the positive sequence stator frame coordinate system.

The alternative calculation considers influence of the negative system on the active power, too.

Reactive power in the positive sequence system is for example calculated with means 9 using:

$$Q_{pos} = Im\{\underline{u}_{n,pos} \cdot \underline{i}^*_{n,pos}\} \tag{3}$$

or alternatively:

$$Q_{pos} = Im\{\underline{u}_{n,pos} \cdot \underline{i}_{n,pos}\} + Im\{\underline{u}_{n,neg} \cdot \underline{i}^*_{n,neg}\} \tag{4}$$

Active and reactive power in the negative sequence system are defined as:

$$P_{neg} = Re\{\underline{u}_{n,pos} \cdot e^{-j \cdot 2 \cdot phi} \underline{i}^*_{n,neg}\} + Re\{\underline{u}_{n,neg} \cdot e^{j \cdot 2 \cdot phi} \cdot \underline{i}^*_{n,pos}\} \tag{5}$$

$$Q_{neg} = Im\{\underline{u}_{n,pos} \cdot e^{-j \cdot 2 \cdot phi} \underline{i}^*_{n,neg}\} + Im\{\underline{u}_{n,neg} \cdot e^{j \cdot 2 \cdot phi} \cdot \underline{i}^*_{n,pos}\} \tag{6}$$

with phi=$Arg\{u_{n,pos}\}$
In the steady state is $Arg\{u_{n,pos}\}=\omega_n \cdot t$ with $\omega_n$ as grid frequency and the values of the negative sequence power $P_{neg}$ and $Q_{neg}$ are dc components since the products of positive and negative sequence voltage and current vectors are transformed with the double angle of the positive sequence voltage vector.

The values for the active and reactive power separately in the positive and the negative sequence system are subtracted from preset values for the active and reactive power in the positive and negative sequence system 10, 11, 12, 13 which are set in order to control the power output of a doubly-fed induction machine.

The four values achieved by subtracting the actual values for active and reactive power in the positive and negative sequence system from preset values are provided to a state controller 14 which is formed in the present embodiment of the invention by four independent controllers 15, 16, 17 and 18. Each controller 15, 16, 17 and 18 generates a manipulated value $uP_{pos}$, $uQ_{pos}$, $uP_{neg}$ and $uQ_{neg}$ depending on the regulation characteristic of the controller. Presently, said values are voltages values. In the present embodiment of the invention each controller 15, 16, 17 and 18 comprises a proportional-integral (PI) controller. The manipulated values generated by the controllers 15, 16, 17 and 18 are related to the active and reactive power in the positive respectively in the negative sequence system.

The manipulated values of controller 15 for the active power in the positive sequence system preferably comprise a rotational speed dependence. Heretofore controller 15 comprises optionally a further input to achieve values of the rotational speed of the rotor from means 32.

The manipulated values generated are state values which can be combined to a state vector for each component system.

However, in order to use the state vector for the power control it is advantageous to transform the resulting state vector into the positive and negative sequence system of the stator frame coordinate system which is done by means 19 and 20.

Means 19 and 20 use the measured stator values 21 first transformed with means 22 into stator frame coordinate system ab and decomposed into a positive and negative sequence system as well as in a dc component system by means 23. The transformation of the state values to a state vector in the positive and negative sequence system of the stator frame coordinate system uses the stator voltage vectors $uS_{pos}$, $uS_{neg}$ in the stator frame coordinate system ab decomposed into the positive and negative sequence system done with means 23. The following equation can be utilized for calculation of the positive sequence state vector components of the controller 14:

$$u_{c,posa} = \frac{(uP_{pos} \cdot uS_{posa} + uQ_{pos} \cdot uS_{posb})}{|uS_{pos}|} \tag{7}$$

and for the second component of the state vector:

$$u_{c,posb} = \frac{(uP_{pos} \cdot uS_{posb} - uQ_{pos} \cdot uS_{posa})}{|uS_{pos}|} \tag{8}$$

For the negative sequence system the components of the state vector are achieved with the following equations:

$$u_{c,nega} = \frac{(uP_{neg} \cdot uS_{nega} + uQ_{neg} \cdot uS_{negb})}{|uS_{neg}|} \tag{9}$$

and $$u_{c,negb} = \frac{(uP_{neg} \cdot uS_{negb} - uQ_{neg} \cdot uS_{nega})}{|uS_{neg}|} \tag{10}$$

As a result, state vectors in the positive and negative sequence system of the stator frame coordinate system are achieved, which are subjected to the state feedback 24 in order to set the rotor voltage with the machine side converter 25.

The state vectors generated by means 19 and 20 are subjected to the state feedback 24. In the present embodiment of the invention both vectors are added so that the resulting state vector includes both systems, on the one hand the positive sequence system and on the other hand the negative sequence system. In the following state feedback 24, a state feedback is done separately for the positive sequence system with means 26, the negative sequence system with means 27 and the dc component system with means 28.

Means 26, 27 and 28 use the positive sequence system, the negative sequence system and dc component system measured values of the rotor current for the three different state feedbacks. The rotor current is measured by means 38. The different system components are derived by means 29 which uses the rotor current values already transferred in the stator frame coordinate system, determined by means 30a and 30. To transfer the measured rotor current values into the stator frame coordinate system, the rotor position angle is measured with means 31 and provided to a position encoder 32 which determines the rotor position angle and the rotor speed.

Means 26, 27 and 28 which calculate the state feedback vectors in the different component systems additionally need the rotor speed determined by the position encoder 32 as well as the stator voltage values decomposed in the different systems, the positive sequence system, the negative sequence system and the dc component system. For the stator voltage this is done with means 23 using measured stator voltage values.

Now, the state feedback is exemplary described for the positive sequence system in the following.

In principle, power output to a grid is the sum of power output of the stator 40, power output of the lineside converter 37 and the power output of parallel filter 39. The power of the filter 39 depends directly on the grid voltage and cannot be controlled with the converter. Therefore, the part of the filter power is not discussed in the following.

Decoupled controllers for the power output of the lineside converter 37 are well known in the art. Therefore, the discussion of the power output of the lineside converter 37 is omitted, too.

For the power output of the stator 40 of the doubly-fed induction machine, the following equation is applied in the positive sequence system in the stator frame coordinate system:

$$\underline{S}_{s,pos} = \underline{u}_{s,pos} \cdot \underline{i}^*_{s,pos} \quad (11)$$

with $\underline{u}_{s,pos}$: stator voltage vector in the positive sequence system;
$\underline{i}^*_{s,pos}$: conjugate complex stator current vector in the positive sequence system;
$P_{s,pos} = \text{Re}\{\underline{S}_{s,pos}\}$ stator active power and
$Q_{s,pos} = \text{Im}\{\underline{S}_{s,pos}\}$ stator reactive power With the aid of the flux equations of the doubly-fed induction machine:

$$\underline{\psi}_{s,pos} = l_s \cdot \underline{i}_{s,pos} + l_m \cdot \underline{i}_{r,pos} \quad (12)$$

$$\underline{\psi}_{r,pos} = l_m \cdot \underline{i}_{s,pos} + l_r \cdot \underline{i}_{r,pos} \quad (13)$$

equation (11) becomes:

$$S_{s,pos} = \underline{u}_{s,pos} \cdot \frac{(l_m \cdot \underline{\psi}_r - l_s \cdot \underline{\psi}_s)}{l_s \cdot l_r - l_m^2} \quad (14)$$

With
$l_s$=stator path inductance
$l_r$=rotor path inductance
$l_m$=main inductance A further state equation for the doubly-fed induction machine is:

$$\underline{u}_s = r_s \cdot \underline{i}_s + \dot{\underline{\psi}}_s \quad (15)$$

and $$\underline{u}_r = r_r \cdot \underline{i}_r - j \cdot \omega_{rot} \cdot \underline{\psi}_r + \dot{\underline{\psi}}_r \quad (16)$$

with
$\underline{u}_s$: stator voltage vector in the stator frame coordinate system,
$r_s$: resistance of the stator,
$\underline{i}_s$: stator current vector,
$\underline{\psi}_s$: stator flux vector,
$\underline{\psi}_r$: rotor flux vector,
$\omega_{rot}$: rotational speed of the rotor.

This yields to the following state equations:

$$\dot{\underline{\psi}}_s = \underline{u}_s - r_s \cdot \underline{i}_s \quad (17)$$

$$\dot{\underline{\psi}}_r = \underline{u}_r - r_r \cdot \underline{i}_r + j \cdot \omega_{rot} \cdot \underline{\psi}_r \quad (18)$$

Equation (14) shows that the eigenvalues of the state equations (17) and (18) determine the characteristics of the stator power transients.

Since the eigenvalues of the state equations (17) and (18) depend on the working point of the DFIG and therefore from rotation frequency of the rotor, the state feedback allows to compensate this dependency and to provide constant eigenvalues independent of the rotational speed of the rotor.

On the one hand, the dependency of the eigenvalue of stator flux of equation (17) from the rotational frequency is low because mainly the grid voltage determines the stator flux. On the other hand, in order to force the damping on the stator side high rotor voltages are necessary, which lead to uneconomical systems.

The eigenvalue of equation (18) is strongly dependent from the rotational speed of the rotor, which means that the eigenvalue of the rotor flux is suitable to force the damping of the doubly-fed induction machine 2.

The rotor voltage vector $\underline{u}_{r,pos}$ in the positive sequence system is put together of the positive sequence state vector $\underline{u}_{c,pos}$ 19 and the positive sequence state feedback $\underline{u}_{feedb,pos}$ 26.

$$\underline{u}_{r,pos} = \underline{u}_{c,pos} + \underline{u}_{feedb,pos} \quad (19)$$

with $$\underline{u}_{c,pos} = u_{c,posa} + j \cdot u_{c,posb} \quad (20)$$

The state feedback in the positive sequence system is defined as:

$$\underline{u}_{feedb,pos} = -\underline{K}_{pos} \cdot \underline{\psi}_{r,pos} + r_r \cdot \underline{i}_r \quad (21)$$

The feedback component of $r_r \cdot i_r$ is small and can often be neglected in the praxis.

Using equation (18) together with equation (21), feedback vector $\underline{K}_{pos}$ can be chosen in a way that the dependency of the rotational speed disappears and the damping, respectively the eigenvalues of the state equations (17) and (18) are rotational speed invariant. This can be achieved by choosing a rotational dependent complex state feedback vector $\underline{K}_{pos}$. For example if $\underline{K}_{pos}$ is chosen in the following way:

$$\text{Im}\{K_{pos}\} = \omega_{rot} \quad (22)$$

$$\text{Re}\{K_{pos}\} = \frac{1}{T_{1,pos}} \quad (23)$$

With $T_{1,pos}$ as a damping constant it follows that $\underline{K}_{pos}$ is defined as:

$$K_{pos} = \frac{1}{T_{1,pos}} + j \cdot \omega_{rot} \quad (24)$$

This yields to the following equation:

$$\dot{\underline{\psi}}_{r,pos} = -\frac{1}{T_{1,pos}} \cdot \underline{\psi}_{r,pos} + \underline{u}_{c,pos} \quad (25)$$

with a laplace transformation the transfer function is achieved:

$$G(s) = \frac{\underline{\psi}_{r,pos}}{\underline{u}_{c,pos}} = \frac{T_{1,pos}}{1 + T_{1,pos} \cdot s} \quad (26)$$

And it follows:

$$\underline{\psi}_{r,pos} = \frac{T_{1,pos}}{1 + T_{1,pos} \cdot s} \cdot \underline{u}_{c,pos} \quad (27)$$

The rotor flux has the typical behaviour of a PT1 system in positive sequence system with a damping time of $T_{1,pos}$.

Finally, the rotor voltage vector in the positive sequence system is defined as:

$$\underline{u}_{r,pos} = \underline{u}_{c,pos} - \left( \frac{1}{T_{1,pos}} + j \cdot \omega_{rot} \right) \cdot \underline{\psi}_r + r_r \cdot \underline{i}_r \quad (28)$$

It results a state feedback control for the positive sequence system with a PT1-behaviour, which can be adjusted in an easy way by choosing an appropriate $T_{1,pos}$. The damping behaviour of the PT1-system is well known, so that the states of the DFIG are well controlled even with unbalanced grid voltages.

Choosing the damping constant $T_{1,pos}$ is preferably done for the positive and negative sequence system as well as for the dc component system separately, which allows trimming of the damping of the DFIG 2 in a broad range for different grid states differently. Usually the time constant $T_1$ has a small value like 0.015 s in order to achieve a quick response of the DFIG on unbalanced grid voltage states. On the other hand the value of $T_{1,pos}$ is limited by the controller hardware and the dc link voltage.

The only unknown value in order to calculate the vector to set rotor voltage is rotor flux $\underline{\psi}_r$ in the positive sequence system. However, $\underline{\psi}_r$ can be calculated by using an observer model and the measured values of $\underline{u}_s$, $\underline{i}_r$ and the rotational speed and angle of the rotor measured with means 31. However, the type of calculation of the rotor flux $\underline{\psi}_r$ is not essential for the present invention.

The same is possible for the negative sequence system as well as for the dc component system used in the present inventive method. It results in different state feedback vectors with PT1 behaviour which ensure a quick response of the power control for a DFIG system.

The state vectors calculated in the above mentioned way are added separately for each component to the state vectors calculated by means 19 and 20. Due to the independency from the rotational speed, the resulting manipulated vector for setting the rotor voltage is provided at first in the stator frame coordinate system ab and transferred into the rotor frame coordinate system by means 33 and to the rotor three phase coordinate system by means 34. The resulting values can be provided to the PWM-control of the machine side converter 25 to set the rotor voltage.

However it is possible that the control described above generates state vectors which are not allowed and which cannot be set with the machine side converter. Means 35 limits the output values of each state vector 19, 20, 26, 27, 28 to preset values. It is possible to prioritise the limitation of the state vectors in the way that the state vector of the positive sequence system is limited as last vector. Since the state feedback vector of the positive sequence system provides active and reactive power in the stator frame coordinate system, the power control prioritises control of non-oscillating active and reactive power.

Optionally, the inventive control method provides a limitation of the preset values for the active and reactive power in the positive and negative sequence system in order to allow only manipulated values which are achievable for the active and reactive power in the different systems. This is done by means 36. Both measures increase reliability of wind turbines or wind parks comprising wind turbines with doubly-fed induction machines.

As can be derived from FIG. 1, the embodiment of the inventive method to control power output of a doubly-fed induction machine uses only one controller 14 and does not use any subordinated regulation loops to generate the manipulated values respectively vectors. It results that the dynamic of the inventive method is very good and even for unbalanced grid voltage a good control about power output of the doubly-fed induction machine is achieved in order to provide a "Fault-Ride-Through" operation.

The invention claimed is:

1. A method to control power output of a doubly-fed induction machine to a grid including the steps:
   measuring grid voltage and grid current in a three phase coordinate system,
   transforming grid voltage and grid current into a stator frame coordinate system,
   decomposing the grid voltage and grid current in the stator frame coordinate system in a positive sequence system and in a negative sequence system,
   calculating active and reactive power in the positive and negative sequence system, and
   controlling active and reactive power in the positive and negative sequence system,
   wherein, active and reactive power in the positive and negative sequence system are used as independent state variables in a state controller, whereas the state controller generates manipulated values in the positive and negative sequence system separately which are subjected as manipulated state vectors to a state feedback in the stator frame coordinate system without further control loops before the manipulated vector resulting from state feedback is used to set rotor voltage.

2. The method according to claim 1, wherein the state controller generates manipulated values separately for the positive and negative sequence system with which a state vector in the stator frame coordinate system is generated separately for the positive and negative sequence system.

3. The method according to claim 1, wherein a state vector of the positive sequence system is added to a state vector of the negative sequence system before a resulting single state vector is subjected to the state feedback.

4. The method according to claim 1, wherein a state feedback vector for the positive and/or negative sequence system and/or a dc component system is added to the state vector as state feedback.

5. The method according to claim 1, wherein stator voltage and rotor current together with values of rotor position and rotor speed are used to calculate the state feedback vectors in the positive and negative sequence system as well as in a dc component system.

6. The method according to claim 1, wherein the state controller receives as input values the difference of preset values and measured values for the active and reactive power in the positive and negative sequence system to generate a manipulated value.

7. The method according to claim 1, wherein the state controller comprises at least one proportional-integral (PI) controller.

8. The method according to claim 6, wherein the preset values of the active and reactive power in the positive and negative sequence system are limited to preset values.

9. The method according to claim 1, wherein the manipulated state vectors in the positive and negative sequence system of the stator frame system are calculated separately using a stator voltage vector and the manipulated values generated by the state controller.

10. The method according to claim 1, wherein the values of the components of the manipulated vectors as well as the values of the components of each state feedback vector added to the manipulated vectors are limited.

11. The method according to claim 10, wherein the limitation of the components of each state feedback vector as well as the limitation of the components of the state vectors of the positive and negative sequence system is prioritized.

12. The method according to claim 1, wherein the state controller generates voltage values of the active and reactive power in the positive and negative sequence system as manipulated values.

13. A device for controlling the power output of a doubly-fed induction machine to a grid enabling a method according to claim 1, the device comprising means to measure grid voltage and grid current, means to transform grid voltage and grid current into the stator frame coordinate system, means to decompose at least positive and negative sequence system components of the grid voltage and grid current, means to calculate active and reactive power in the positive and negative sequence system, the state controller, which generates manipulated state values in the positive and the negative sequence system separately and to provide the state feedback to generate a manipulated vector used to set rotor voltage.

14. A computer program enabling processor means to control power output of a doubly-fed induction machine in the method according to claim 1.

15. The method according to claim 1, wherein the method is used to control power output of a wind turbine to the grid or a wind park comprising a plurality of wind turbines including doubly-fed induction machines to the grid.

16. The method according to claim 6, wherein each manipulated value is generated by a single controller.

* * * * *